United States Patent
Lu et al.

(10) Patent No.: US 10,288,220 B2
(45) Date of Patent: May 14, 2019

(54) MULTISTABLE STRUCTURE AND A METHOD FOR MAKING THEREOF

(71) Applicant: City University of Hong Kong, Kowloon (HK)

(72) Inventors: Jian Lu, Kowloon (HK); Xiaoqiao He, New Territories (HK); Shenghui Yi, Hunan Province (CN)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 259 days.

(21) Appl. No.: 15/165,639

(22) Filed: May 26, 2016

(65) Prior Publication Data

US 2017/0062000 A1     Mar. 2, 2017

Related U.S. Application Data

(60) Provisional application No. 62/210,575, filed on Aug. 27, 2015.

(51) Int. Cl.
    *B32B 3/00*       (2006.01)
    *F16S 1/06*       (2006.01)
    *C22F 3/00*       (2006.01)

(52) U.S. Cl.
    CPC . *F16S 1/06* (2013.01); *C22F 3/00* (2013.01)

(58) Field of Classification Search
    CPC ...................................... C22F 3/00; F16S 1/06
    See application file for complete search history.

(56) References Cited

U.S. PATENT DOCUMENTS 9,744,563 B2 *    8/2017    Benjamin ............... F04B 19/20

* cited by examiner

*Primary Examiner* — Elizabeth E Mulvaney
(74) *Attorney, Agent, or Firm* — Renner Kenner Greive Bobak Taylor & Weber

(57) ABSTRACT

A multistable structure including local portions arranged to undergo processing by at least one of the physical treatment and chemical treatment so as to form localized stimulations of the treated portions; wherein the treated portions are arranged to interact with the untreated portion of the structure to form a prescribed residual stress distribution associated with the treated portions and the untreated portion of the structure, the prescribed residual stress distribution being arranged to provide at least one alternative stable configuration to the structure.

22 Claims, 16 Drawing Sheets

MULTISTABLE STRUCTURE AND A METHOD FOR MAKING THEREOF

TECHNICAL FIELD

The present invention relates to a multistable structure and a method for making thereof, and particularly, although not exclusively, to a multistable structure and a method for making thereof by using local stimulations formed by physical and/or chemical treatments such as surface mechanical attrition treatment (SMAT).

BACKGROUND

Adaptive structures are structures which can change from one stable configuration to another so as to adapt to a particular need during an operation with the structure. The structure with an ability of holding multiple configurations may have various uses in certain industries where morphing structures offer advantages. As examples, the applications include components such as valves or robotic structures as well as wings or components on aircraft or road vehicles which may be required to change in structural configuration during operation for maximum efficiencies or designed functions.

Bistable shells which can be considered to be one form of adaptive structures are manufactured with unique characteristics of having two stable configurations. They are potentially suitable for application in structures involving shape adaptation due to their unique ability to hold different stable states without any external input energy or support.

Bistable disks are the simplest bistable shells, which could be achieved without residual stresses in the initial state, such as bistable spherical rubber caps. Bistable disk are widely used in industrial and this bistable mechanism is regularly utilized to develop new functional structures, such as reconfigurable multistable shells, snap surfaces, etc. As molds in spherical configurations are used for building bistable disks, the manufacturing process is cumbersome and the configurations are not convenient to be changed.

Bistable disks with residual stresses are usually cylindrical obtained by stimulations over the structures bending in two directions, and many bistable shells are manufactured based on the same bistable mechanism, such as bistable unsymmetric composite shells obtained based on thermal effect, bistable metallic shells by plastically bending in two directions, bistable surface-stressed shells, etc. Those bistable shells are promising to be used for morphing wings. Bistable spherical disks by non-uniform growth are proposed and proved to exist theoretically. Currently there is no applicable method to manufacture bistable spherical disks using such a mechanism.

Multistable shells with an ability of holding more than two configurations are desired in the industrials for achieving a more flexible shape adaptation. Several tristable shells have been proposed and one of them was experimentally manufactured from composite shells in the art. To obtain multistable shells, multiple bistable composite shells were assembled using joints or tessellated in one structure; however, the assembled multistable structures were only results of discrete bistable shells without a smooth surface and the tessellated shells were only able to hold two stable states due to the strong coupling effect between stretching and bending deformations. Multistable dimpled or microlens based shells were manufactured but they were not suitable for bearing external loads because they were made from ultra thin shells with thickness of about 100 μm.

For current bistable disks or shells, bending deformations dominate the transitions and the load bearing capacities of the bistable disks or shells are limited. Also, the stable configurations of current bistable shells or multistable shells are limited. The manufacturing methods of bistable shells are different and thus improvements to the method of manufacturing thereof, so as to make bistable or multistable shells with designable stable configurations, may make the industrial applications of bistable or multistable shells more realizable.

SUMMARY OF THE INVENTION

In accordance with a first aspect of the present invention, there is provided a method to produce multistable shells comprising local surfaces having been processed by a surface manipulation technique arranged to induce physical characteristics to enable multiple stable configurations for the developed shells.

One of the advantages of certain embodiments of the present invention is that there is provided a method to build bistable or multistable shells with designable configurations and enhanced stabilities by using localized stimulations.

In an embodiment of the first aspect, the localized stimulations may come from surface manipulation techniques, which include surface mechanical attrition treatment (SMAT).

In an embodiment of the first aspect, the surface mechanical attrition technique is arranged to induce residual stress fields by treatments on the localized surfaces of a plate to enable the processed structure to hold multiple stable configurations.

In accordance with a second aspect of the present invention, there is provided a method for making a multistable shell using SMAT comprising the steps of:

Step 1: Sticking adhesive tapes on the surfaces of plates or using shutters with holes in various shapes to form local regions to be treated with SMAT.

Step 2: Applying the treatment to localized surfaces of a plate to induce internal forces so as to form two or more stable configurations.

In some examples, SMAT is used to induce localized stimulations in order to develop prescribed residual stress fields, which enable the developed shells to hold different stable configurations. Bistable or multistable shells with different stable configurations can be achieved as the residual stress field can be delicately controlled via the proposed method.

Also the obtained bistable or multistable shells from one example method of this invention using SMAT can be conveniently further processed with other mechanical processes to modify the stable configurations but remain a bistable or multistable feature. In addition, a nanocrystalline surface layer, refined grains in the subsurface layers and nanotwins are induced in the microstructure during the treatment, which largely increase the material's yield strength and elastic behavior regime. The elastic deformation ability of the developed shells is largely increased compared with the original plates. Due to the prescribed distribution of the residual stresses, the developed shells could have excellent load bearing capacities compared with the existing bistable or multistable shells.

In one embodiment, SMAT is used to locally treat thin plates on both sides to induce large internal forces by the accumulated plastic deformations from the treatment in the treated region under the constraints from the untreated region. The internal forces enable the plates to form domelike configurations in two sides, whose configurations are determined by the shape of the treated region, and the plates become bistable with one treated region. The made-up bistable shells can be further processed with other mechanical processes, such as plastically bending or folding, to obtain bistable shells with complex configurations.

In another embodiment, the region to be treated with SMAT can be separated into many zones and each separated zone can cap down or cap up after the SMAT process. The different combinations of the treated zones capping down or up can realize various stable configurations for the developed multistable shell. As the shape of each treated region can be friendly chosen by using adhesive tapes and the distribution of those regions can be conveniently controlled, the stable configurations of the multistable shells from the proposed method can be delicately designed. The proposed method offers an approach to obtain bistable or multistable shells with desired stable configurations.

In bistable examples where there are traditional bistable composite shells obtained based on thermal effect and bistable metallic shells by plastically bending in two orthotropic directions, the bending deformation is dominant during the transitions between two stable configurations. The transverse force to transition bistable shells, which is referred as the load bearing capacity of bistable shells, is low due to the weak bending stiffness of thin plates. For the bistable metallic shells from at least one embodiment of this invention, an observable in-plane deformation is induced during the transition process along with the bending deformation. Large in-plane forces are induced with the in-plane deformation which make a lot of energy and a large external transverse force required for the transitions. So the bistable metallic shells from the proposed method have much better stabilities and the stable configurations have higher load bearing capacities. A cylindrical bistable metallic shell by plastically bending in two directions with dimensions of 85×85×0.46 mm$^3$ could only hold a concentrated force of about 20N applying at the center of the shell, but a cylindrical bistable metallic shells with the same dimensions from embodiments of this invention could hold external forces of more than 120N.

In accordance with a third aspect of the present invention, there is provided a method to build bistable disks or shells, and multistable shells using internal in-plane stresses, which come from localized stimulations, such as mechanical treatments, laser sintering, temperature, pH, solvent swelling, magnetism, electric current, light, chemical oxidation, etc. In an embodiment of this aspect, the mechanical treatment includes surface manipulations, such as surface mechanical attrition treatment.

In an embodiment of the third aspect, a localized stimulation is arranged to induce residual stress fields from a localized treatment on the surfaces of an original flat disk-shaped plate to enable the processed disk to hold two stable configurations.

In accordance with a fourth aspect of the present invention using a surface manipulation technique, SMAT, to build bistable disks, there is provided a method for making them comprising the steps of:
Step 1: Sticking adhesive tapes on the surfaces of original flat disks or using shutters with circular holes to form a local circular region to be processed with SMAT.
Step 2: Processing the prepared disks with SMAT to induce internal forces so as to form two stable configurations for the processed disks.

One of the advantages of certain embodiments of the present invention is that there is provided a method to build bistable disks whose configurations can be conveniently controlled and the hard materials, including various metals, can be utilized to develop bistable disks or shells with large load bearing capacities.

In one embodiment of the present invention, the built bistable disk using SMAT for a disk with thickness of 0.56 mm and radius of 40 mm, can hold an external point force of more than 300 N applying at the disk center before snapping into the other stable state.

In accordance with the first aspect of the present invention, there is provided a multistable structure comprising: local portions arranged to undergo processing by at least one of the physical treatment and chemical treatment so as to form localized stimulations in the treated portions; wherein the treated portions are arranged to interact with the untreated portion of the structure to form a prescribed residual stress distribution associated with the treated portions and the untreated portion of the structure, the prescribed residual stress distribution being arranged to provide at least one alternative stable configuration to the structure.

In one embodiment of the first aspect, more than one stable configuration can be held without consuming external energies or requiring supports for the processed structure, depending on the number of the treated portions.

In one embodiment of the first aspect, the processed structure is induced with prescribed residual stresses by the localized stimulations to enable multistabiltiy.

In one embodiment of the first aspect, the treated portions interact with the untreated portion to produce prescribed residual stress fields for providing multistability to the structure.

In one embodiment of the first aspect, the localized stimulation is obtained from physical treatment and/or chemical treatment.

In one embodiment of the first aspect, the localized stimulation is obtained from mechanical treatments, laser sintering, temperature, pH, solvent swelling, magnetism, electric current, light and/or chemical oxidation.

In one embodiment of the first aspect, the physical treatment includes surface manipulating technique.

In one embodiment of the first aspect, the surface manipulating technique includes surface mechanical attrition treatment (SMAT).

In one embodiment of the first aspect, the treated portion is stretched with the induced stimulations from the physical treatment or chemical treatment, and constrained by the untreated portion.

In one embodiment of the first aspect, the bistable behavior is associated with the interaction between the treated portions and the untreated portion such that the structure deforms into stable configurations by induced internal forces to relief compressive stresses through the coupling effect of stretching and bending deformations.

In one embodiment of the first aspect, the configuration is manipulated by the combinations of a plurality of treated portions capping up or down.

In one embodiment of the first aspect, the treated portions can have various shapes, such as circular, elliptic, rectangular, triangular, or irregular shapes, and be distributed in row, matrix, or irregular forms.

In one embodiment of the first aspect, the transitions among multiple stable configurations do not involve any plastic deformations but stay within the elastic regime of the structure.

In one embodiment of the first aspect, the local portions have predetermined zones to be treated with physical treatments forming at least part of the multistable structure.

In one embodiment of the first aspect, the treated portions act as switchers to manipulate the configuration.

In one embodiment of the first aspect, the treated portion becomes a nanostructured portion.

In one embodiment of the first aspect, a nanocrystalline surface layer, refine grains in nanoscales and nanotwins are induced in the treated portion by the surface manipulating technique.

In one embodiment of the first aspect, the yield strength and elastic behavior regime of the structure are enhanced by the surface manipulating technique.

In one embodiment of the first aspect, the stimulation is an accumulation of in-plane uniform and transversely gradient plastic deformation in the treated portion.

In one embodiment of the first aspect, the shape of the original structure and the treated portion are circular and the processed structure forms a bistable disk.

In one embodiment of the first aspect, the multistable configurations of the structure are determined by the applied physical or/and chemical treatment, the geometries of the treated portion and the structure.

In one embodiment of the first aspect, the optimal stability of the structure has a treated portion to structure ratio of 25%-53%.

In one embodiment of the first aspect, the treated portion to structure ratio of about 50% gives maximum deflections in stable configurations and load bearing capacities for the processed structure.

In one embodiment of the first aspect, further mechanical manipulations, including plastically bending and folding, could be applied to modify the configurations of the processed structure with localized stimulations.

In one embodiment of the first aspect, the structure is made of hard materials such as metals.

In one embodiment of the first aspect, the structure is made of soft materials such as Polydimethylsiloxanen (PDMS).

In one embodiment of the first aspect, prescribed residual stress fields are left due to localized stimulations.

In one embodiment of the first aspect, the treated surface portion is stretched due to surface manipulations.

In one embodiment of the first aspect, the treated surface portion is constrained into a compressive state by the untreated surface portion.

In one embodiment of the first aspect, the load bearing capacity of the structure in different stable configurations varies with the dimensions, thickness or material properties of the structure and the applied treatment as well as the dimensions of the treated region.

In one embodiment of the first aspect, the optimal ratio of the nanostructured region depends on the dimensions, thickness and material properties of the structure.

In one embodiment of the third aspect, the structure is disc-shaped and the processed region is a circular region.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Without wishing to be bound by theory, the inventors, through their own research via trials and experimentation, have discovered that existing bi-stable or multi-stable structures known in the art are not fit well for bi- or multi-configuration purposes. Specifically, conventional bistable or multistable shells are subjected to certain limitations such as limited configurations, weak bending stiffness and low load bearing capacities, thus lack practical applications in industrials.

Although SMAT or other alternative surface manipulation techniques are available and commonly practiced in the art, they are merely utilized to induce localized stimulations for developing residual stress fields to structures. Usually the surface manipulation techniques are applied to the whole structures in order to improve the mechanical properties of structures. Such conventionally treated structures are not able to hold multiple configurations, because no reliable residual stress field is left in the structure to hold any deformed configuration.

Even if the treated structures are modified and adapted for bi-stable or multi-configurations, such as the bistable unsymmetrical composite shells obtained based on thermal effect, cylindrical plastically bended bistable metallic shells, and dimpling or microlens based multistable shells, the obtained bistable or multistable structures may be not stiff enough to hold their multiple configurations under external forces. Furthermore, the configurations in stable states are limited, especially for bistable structures. Such limitations are fatal and therefore conventional bistable or multistable structures are not suitable enough for highly demanding multi-configuration applications.

Figure 9:
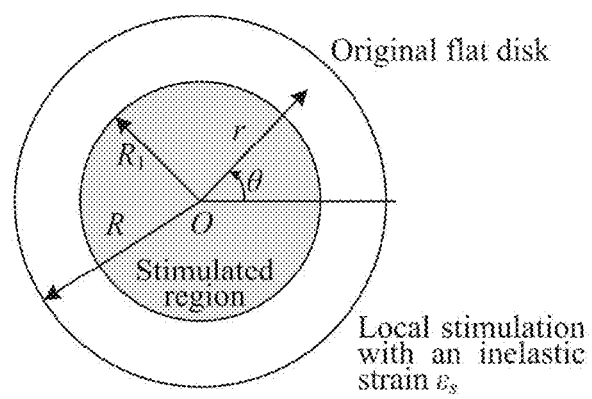
FIG. 9 is an illustration showing the local region to be applied with stimulations within an original flat disk.
Figure 14:
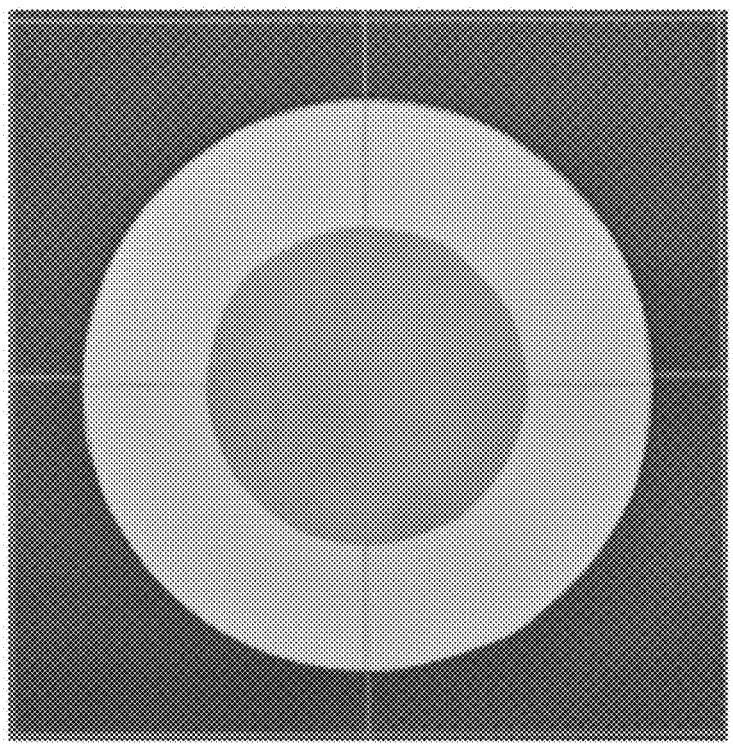
FIG. 14 is an illustration showing a prepared 304 stainless steel disk with adhesive tapes.
Figure 15:
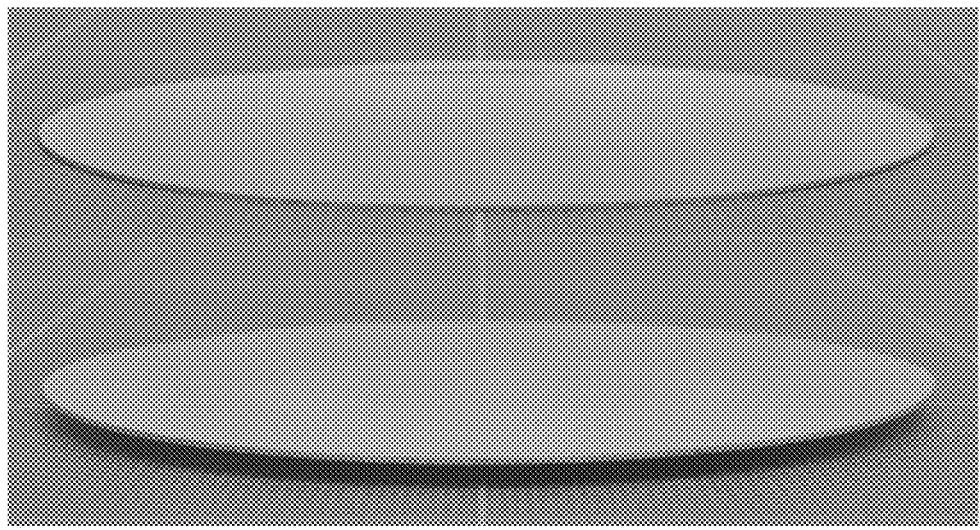
FIG. 15 is an illustration showing two stable configurations of one developed bistable disk using SMAT.

In some example embodiments of the present invention, the surface of the structure to be treated undergoes SMAT with alternative arrangement comparing to the state of the art. In one example embodiment, a square plate preferably made of 304 stainless steel is processed with SMAT in a circular zone, which results in a bistable shell with two stable configurations shown in FIG. 1. In an alternative example embodiment, a flat disk made of 304 stainless steel plate is processed with SMAT in a circular zone (as shown in FIGS. 9 and 14) to achieve a bistable disk as shown in FIG. 15.

Figure 12:
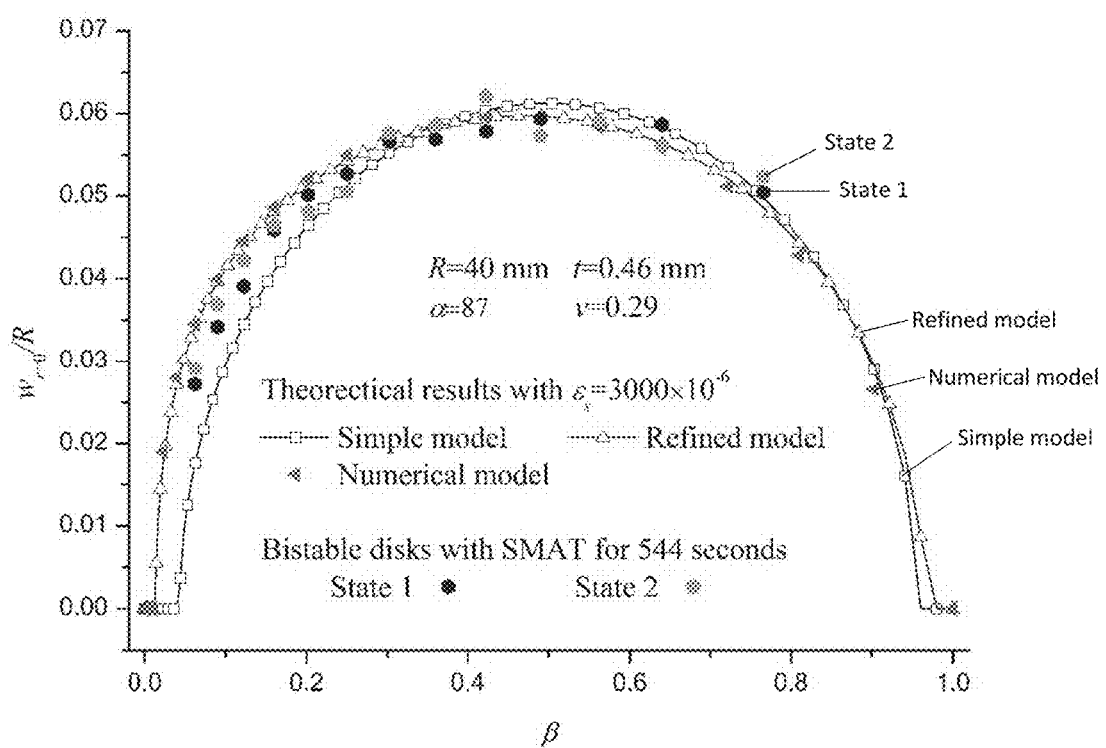
FIG. 12 are curves showing the relations of the deflection at disk center with respect to the ratio of the stimulated local region from different theoretical models and the measured deflections of the manufactured bistable disks using SMAT for 544 seconds in a local region of different dimensions.
Figure 13:
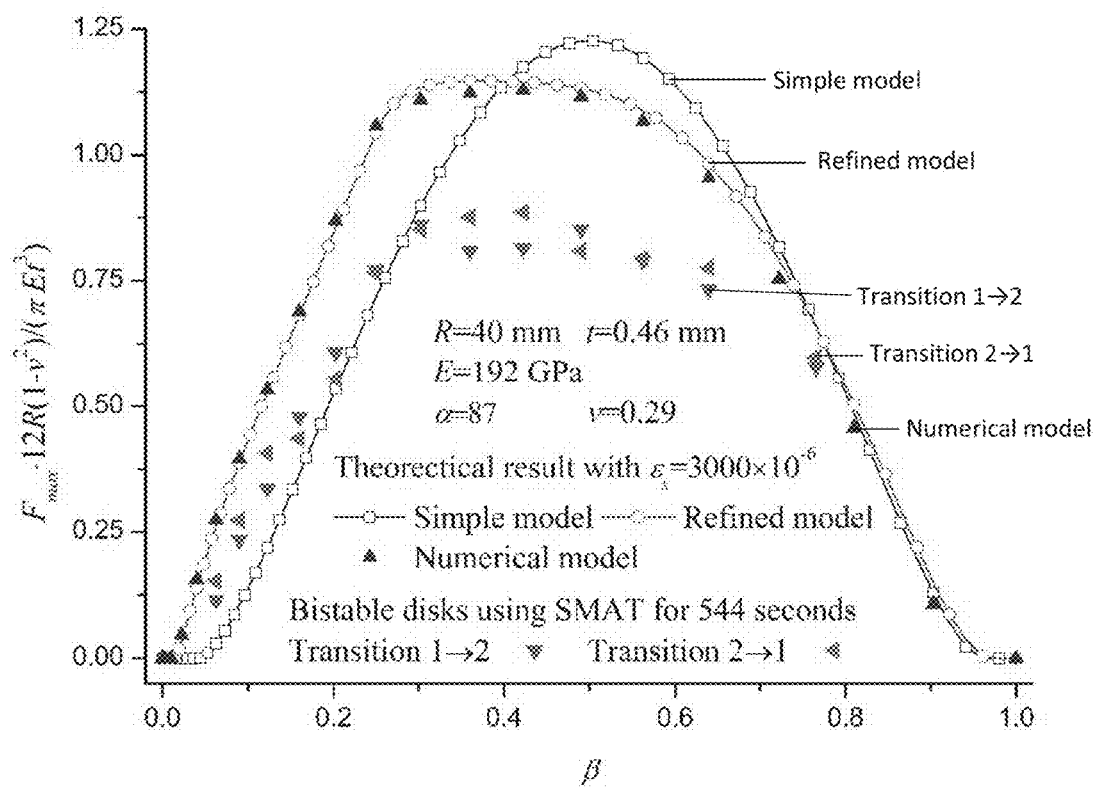
FIG. 13 are curves showing the snap forces during transitions of developed bistable disks with respect to the ratio of the stimulated local region and measured values for bistable disks using SMAT for 544 seconds in a local region of different dimensions.

Advantageously, only the selected region, which is calculated to be around 25-53% of the entire structure, is treated with SMAT to give a bistable structure with desirable deflections and load bearing capacities based on the findings of the inventors as set out in FIGS. 12 and 13. Within this range in particular, the untreated region provides enough constraints to hold the treated region and in turn, the treated region provides enough stretching effect to obtain bistable or multistable structures with optimal stability. To achieve maximum deflections in different configurations and largest load bearing capacities, the treated region should be approximately 50% of the entire structure.

One of the advantages of the present method to build bistable or multistable structures lies in its controllable bistable or multistable properties. The configurations and load bearing capacity could be manipulated according to the selection of dimensions, thickness, material properties, and treated regions of the structure, and the applied treatment.

Preferably, the treated bistable shell may undergo further mechanical treatments. In one example embodiment, the domelike bistable shell in FIG. 1 may further undergo plastically bending to obtain an enhanced cylindrical bistable shell as shown in FIG. 2. In another example embodiment, the bistable shell with an elliptic nanostructured region in FIG. 4 may undergo plastically folding at two ends in the untreated region to obtain the bistable structure shown in FIG. 5.

Figure 4:
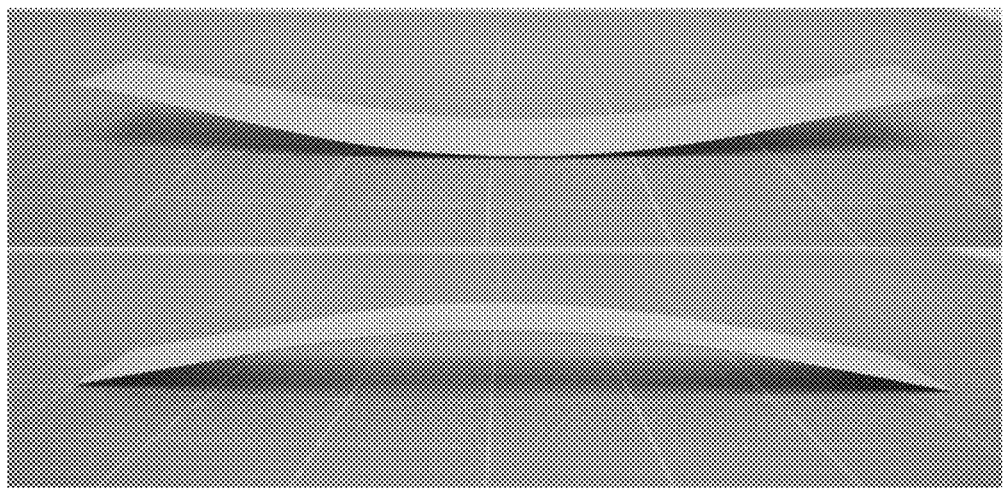
FIG. 4 is an illustration of two stable configurations of a developed bistable rectangular shell with an elliptic nanostructured region in a rectangular plate.

Advantageously, the curvatures of the bistable shell may be manipulated by the SMAT process. In one example embodiment, the bistable shell with an elliptic nanostructured region may be provided with two symmetric stable configurations of non-uniform curvatures, as shown in FIG. 4.

Figure 6:
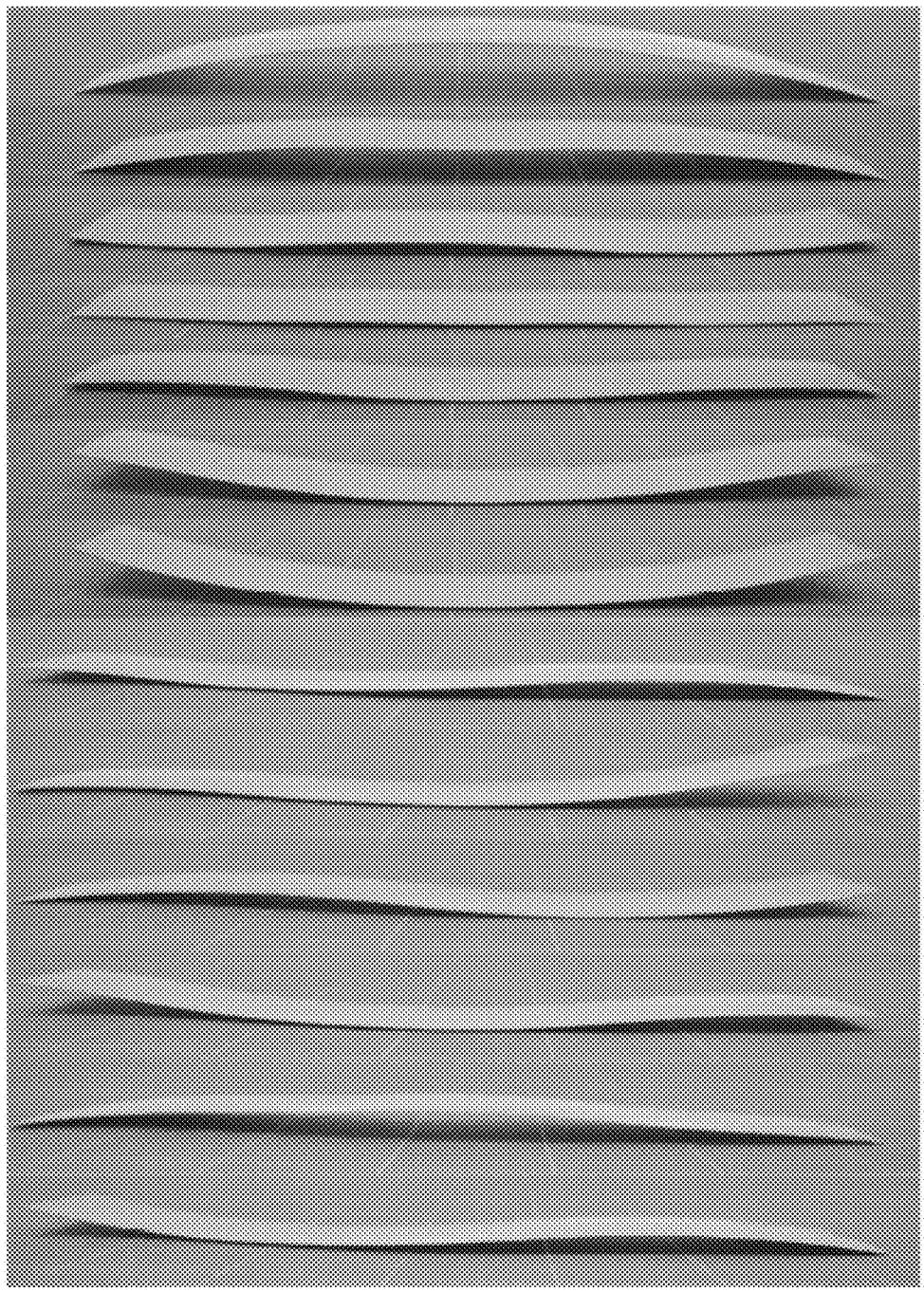
FIG. 6 is an illustration for 7 symmetric and 6 unsymmetric stable configurations of a multistable shell with seven circular nanostructured zones.
Figure 7:
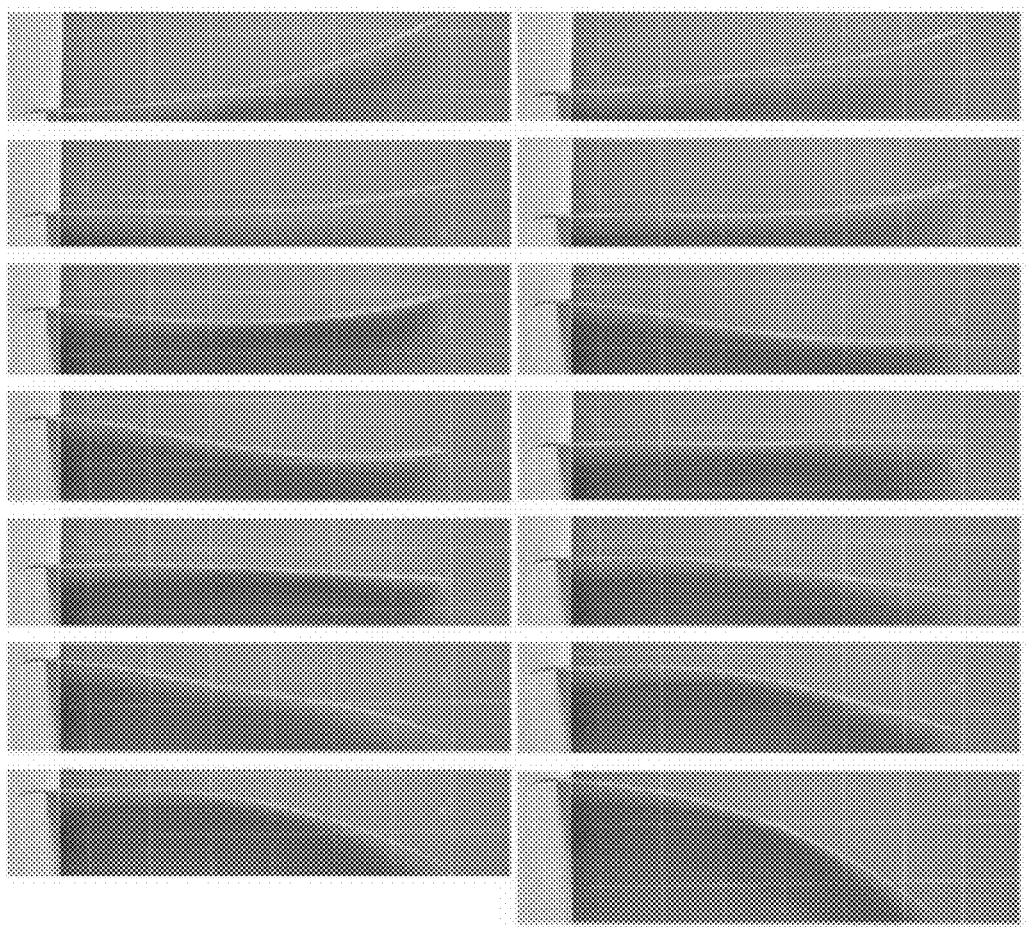
FIG. 7 is an illustration for various stable configurations of the multistable shell with one end fixed.
Figure 8:
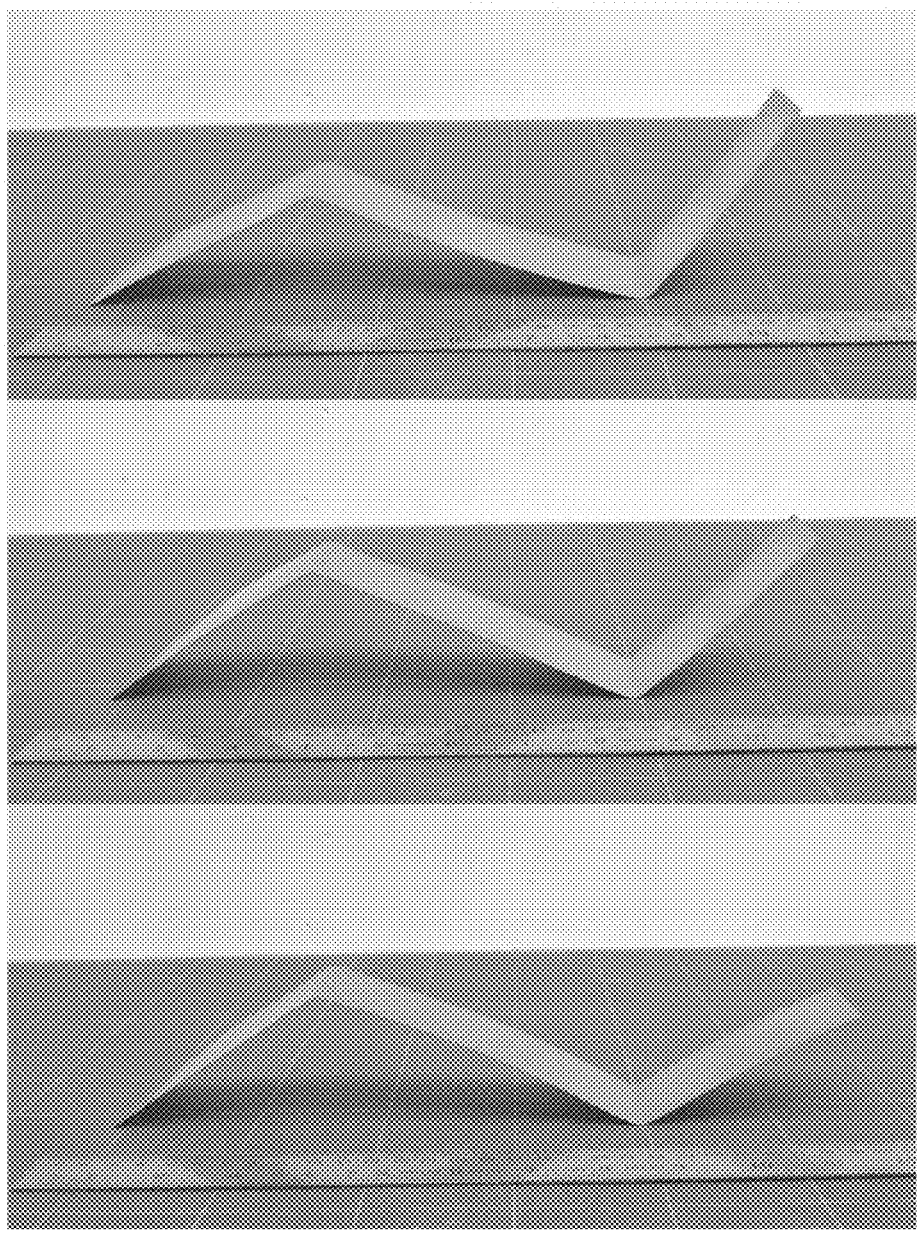
FIG. 8 is an illustration for various stable configurations of the modified multistable shell.

In some example embodiments, various desirable configurations of the processed shells may be manipulated by a plurality of nanostructured zones and a combination thereof being capping up or capping down, as shown in FIGS. 6-8. In one example embodiment, a plurality of symmetrical or unsymmetrical stable configurations are obtained by the manipulation of the plurality of the nanostructured circular zones, as shown in FIG. 6.

Figure 1:
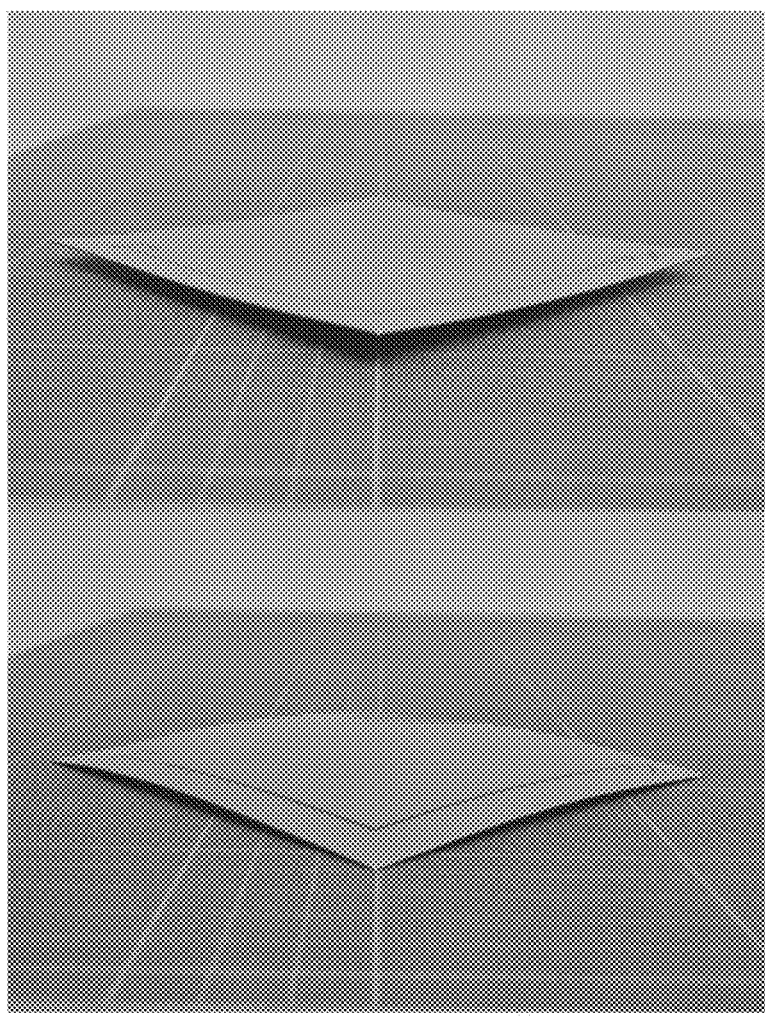
FIG. 1 is an illustration showing the two stable configurations of the domelike bistable shell with a circular region processed with SMAT.
Figure 2:
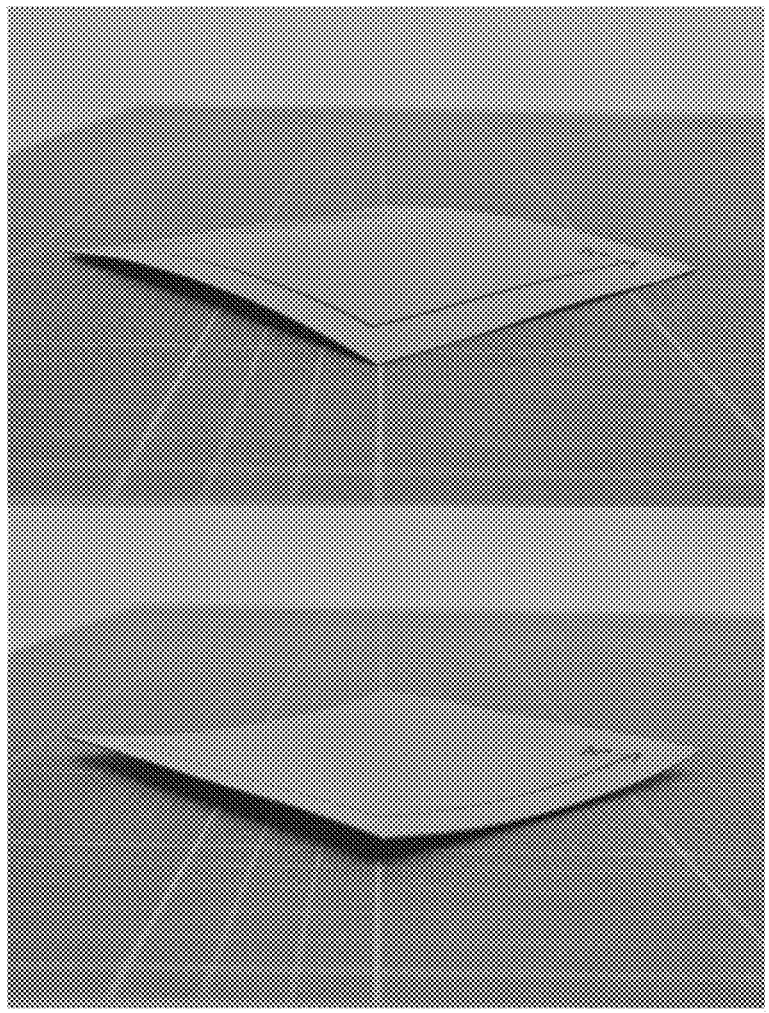
FIG. 2 is an illustration of two stable configurations of the cylindrical bistable shell by using SMAT and plastically bending in two directions.

With refer to FIG. 1, this is provided a multistable structure comprising: local portions arranged to undergo processing by at least one of the physical treatment and chemical treatment so as to form localized stimulation of the treated portions; wherein the treated portions are arranged to interact with the untreated portion of the structure to form a prescribed residual stress distribution associated with the treated portions and the untreated portion of the structure, the prescribed residual stress distribution being arranged to provide at least one alternative stable configuration to the structure.

Referring now to FIG. 1, in this embodiment, a metal plate, for example, a square 304 stainless steel plate is processed with SMAT in a circular zone to manufacture a bistable shell. The high speed chaotic bombardment during the SMAT process creates an accumulation of in-plane uniform but transversely gradient plastic deformations in the treated region. This results in a compressive state for the treated region under the constraint from the untreated region. With properly chosen SMAT parameters, sufficient plastic deformations deform the square plate into domelike configurations by induced internal forces to relieve the compressive stresses, similar to the buckling phenomenon of a plate subjected to a large external in-plane compressive force. With in-plane residual stresses stored in the structure, the square plate becomes a bistable shell with two domelike configurations, as shown in FIG. 1. There are many parameters determining the effect of SMAT, including the material properties and thickness of the plate, the material, diameter, velocity and number of the small balls used, and the height between the excitation surface and target, which can be fully controlled. Balls with different diameters should be used to develop domelike bistable shells with different thicknesses.

This bistable behavior is possible because the impacts change the microstructure, inducing nanotwins and nanoscale grain structures, which dramatically enhance the yield strength and elastic behavior regime of the processed material. This means that the transitions between stable configurations don't involve with plastic deformations, staying instead within the elastic regime of the material. Owing to a localized treatment, this method can be further utilized to obtain cylindrical bistable shells with largely enhanced load bearing capacities by iteratively processing plates with SMAT and plastically bending. Two stable configurations of the obtained cylindrical bistable shell are shown in FIG. 2.

Figure 3:
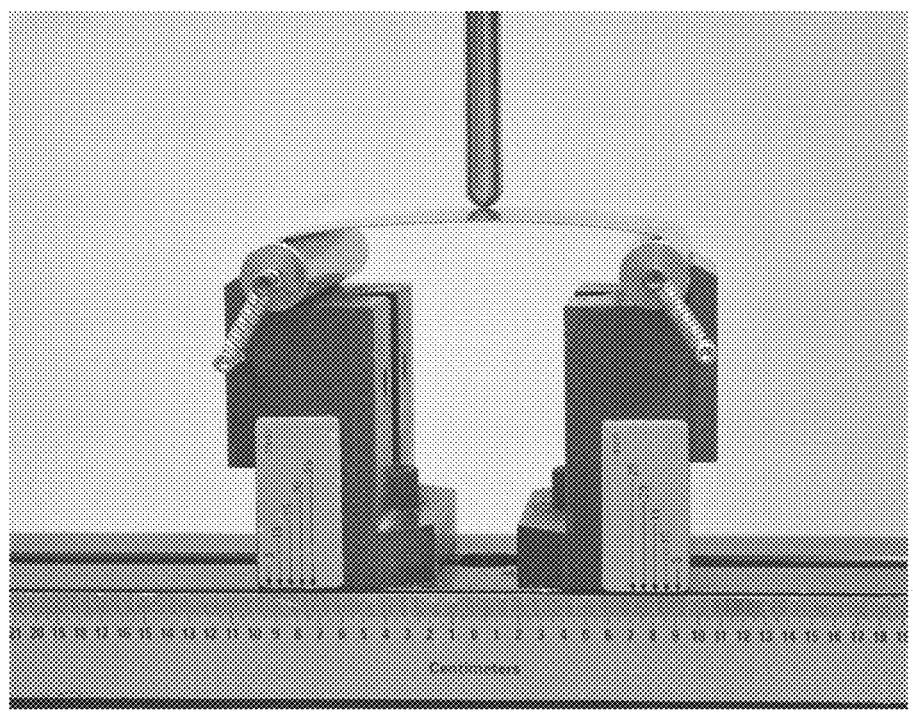
FIG. 3 is an illustration of the testing setup for transitions of bistable square shells.

To demonstrate the superiority of one example embodiment of the present invention, the developed domelike and cylindrical bistable shells with dimensions of 85×85×0.46 mm$^3$ and a circular nanostructured region with diameter D were tested for the load bearing capacities by applying a point force at the center of the shells which were simply supported by two round bars with a span of 80 mm as shown in FIG. 3. Also cylindrical bistable shells made by plastically bending in two directions were fabricated using the same plates and tested using the same setup for transitions. The experimental results are collected in Table (below). Balls with 2 mm diameter were used in SMAT for bistable shells with thickness t=0.46 mm and balls with diameter of 3 mm were used for bistable shells with t=0.56 mm and t=0.77 mm. The total processing times in the treatment are shown in brackets.

TABLE 1

Experimental results of average snap forces |F| required input energies U and stiffness of two transiting processes between two stable states of bistable shells manufacturing using different methods.

| Bistable shells and manufacturing method | SMAT region's diameter D (mm) | \|F\| (N) | U (mJ) | Stiffness (N/mm) | \|F\| (N) | U (mJ) | Stiffness (N/mm) | \|F\| (N) | U (mJ) | Stiffness (N/mm) |
|---|---|---|---|---|---|---|---|---|---|---|
| | | t = 0.46 mm | | | t = 0.56 mm | | | t = 0.77 mm | | |
| Cylindrical bistable shells using bending | — | 14 | 28 | 7 | 20 | 38 | 11 | 11 | 11 | 14 |
| Domelike bistable shells using SMAT (672 s for t = 0.46 mm, 288 s for t = 0.56 mm, 460 s for t = 0.77 mm) | 70 | 118 | 218 | 41 | 229 | 562 | 60 | 345 | 708 | 107 |
| | 60 | 137 | 252 | 46 | 217 | 438 | 64 | 355 | 777 | 111 |
| | 50 | 124 | 169 | 48 | 184 | 290 | 62 | 307 | 571 | 122 |
| | 40 | 68 | 103 | 38 | 137 | 207 | 62 | 167 | 296 | 72 |
| | 30 | 45 | 56 | 28 | — | — | — | — | — | — |
| Cylindrical bistable shells using bending + SMAT (832 s for t = 0.46 mm, 400 s for t = 0.56 mm, 600 s for t = 0.77 mm) | 70 | 106 | 232 | 30 | 169 | 399 | 47 | 190 | 399 | 72 |
| | 60 | 121 | 230 | 34 | 159 | 298 | 48 | 184 | 404 | 69 |
| | 50 | 116 | 204 | 34 | 171 | 351 | 47 | 207 | 414 | 81 |
| | 40 | 91 | 175 | 25 | 112 | 221 | 35 | 111 | 231 | 50 |
| | 30 | 52 | 109 | 16 | — | — | — | — | — | — |

*The stiffness of the bistable shell is regarded as the ratio of the average force over the displacement until the applied point force reaching the maximum value.

These results clearly demonstrate the superiority of the developed bistable shells from the invention. The in plane residual stresses in the nanostructured region enable the developed bistable shells to require a significantly higher energy and force to produce transitions, creating much more stable bistable structures, compared with traditional bistable shells. It is also shown that the load bearing capacities of the proposed bistable shells are selective via the nanostructured region ratio.

The stable configurations of the developed bistable shells based on a localized stimulation are determined by the applied stimulation, the shape and dimensions of the treated region, and the dimensions of plates. Owing to the strong ability to hold two stable configurations through a localized treatment, further mechanical processes in the untreated region or in the treated region of the developed shell would not significantly adversely affect the bistability of the treated region. Thus, bistable or multistable shells with desired configurations can be obtained with plates using SMAT and combining with other mechanical processes.

Figure 5:
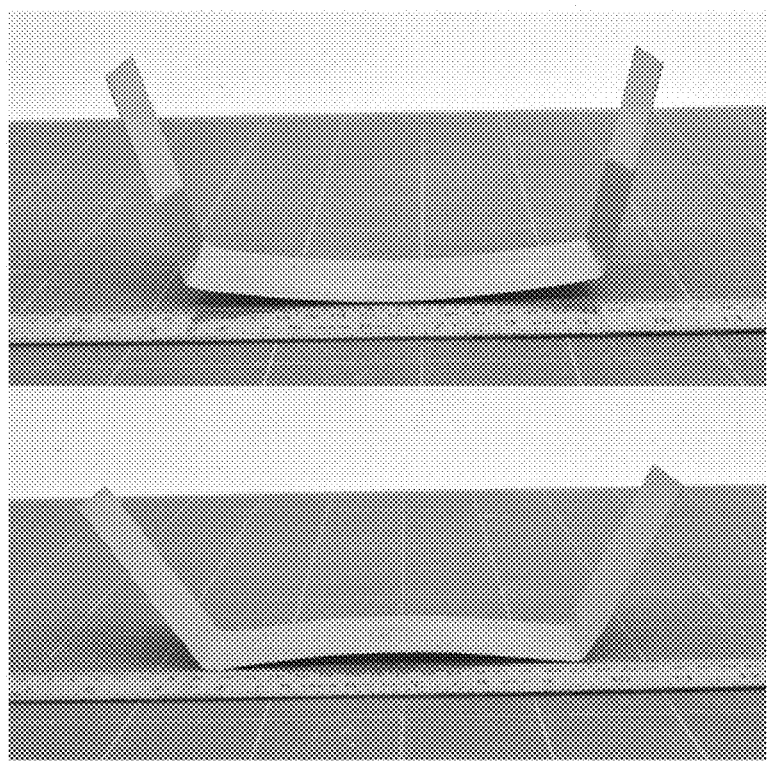
FIG. 5 is an illustration showing two stable configurations of the modified bistable rectangular shell by plastically folding in two untreated ends.

For example, a square plate can have two symmetric domelike or cylindrical stable configurations with a circular nanostructured region. Bistable shells with unsymmetrical stable configurations are achievable by controlling the SMAT treating times on the two surfaces. To obtain designable configurations, the locally processed region can have various sizes and shapes, such as rectangular, triangular, circular or irregular shapes. When a rectangular plate is processed with an elliptical region, the flat plate becomes a bistable shell with two symmetric stable configurations of non-uniform curvatures, as shown in FIG. 4. The obtained bistable shells can be further processed to obtain bistable structures, one of which is shown in FIG. 5 by plastically folding at two ends in the untreated region. The nanostructured region acts as a switcher to control the stable configurations.

Figure 16:
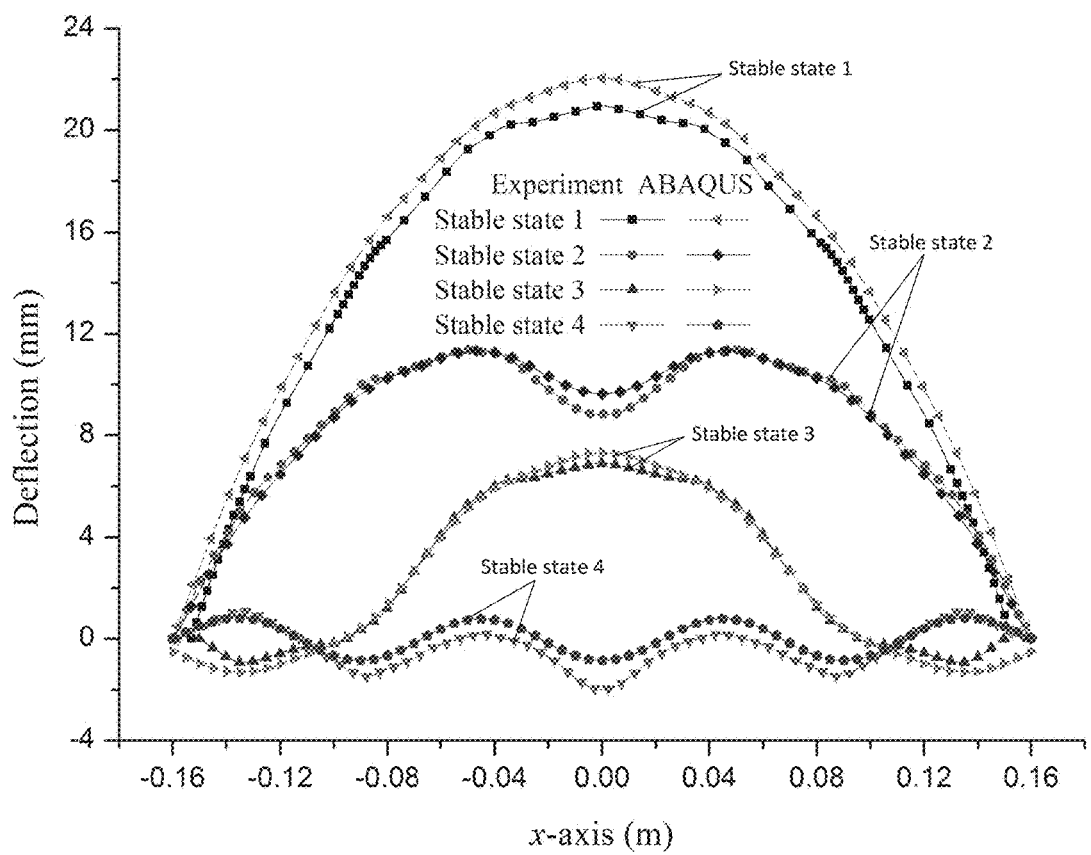
FIG. 16 is an illustration showing the relations of the measured deflections along the middle line parallel to the long side in the first four stable configurations of the processed multistable shell in FIG. 6 and the predicted deflections from numerical simulations using ABAQUS.

In addition, the region to be processed with SMAT can be separated into several zones. Various stable configurations, depending on the number of the locally stimulated regions, can be held by the combinations of the nanostructured zones capping down or up. Several stable configurations of the developed multistable shell with dimensions of 320×50× 0.46 mm$^3$ and seven circular nanostructured zones are shown in FIG. 6. Numerical simulations by using a commercial software, ABAQUS, can be used to predict the stable configurations. The relations of the measured deflections along the middle line parallel to the long side in the first four stable configurations of the processed multistable shell in FIG. 6 and the predicted deflections from numerical simulations using ABAQUS are shown in FIG. 16.

FIG. 7 shows stable configurations of the developed shell with one end fixed. The difference of the deflections at the free end of the shell in the first and last stable configurations is more than 210 mm. There exist $2^n$ stable configurations for the developed shell with n separated nanostructured zones. Furthermore, other mechanical processes can be further combined to modify the configurations of the developed multistable shells using SMAT, one of which is shown in FIG. 8. The stable configurations are controlled by the nanostructured regions capping down or up, which could have various shapes, such as circular, elliptic, rectangular, triangular, or irregular shapes, and be distributed in row, matrix, or even irregular forms.

At least one embodiment of the present invention provides an advantage in that there is provided a method to obtain bistable or multistable shells with designable configurations and better stabilities, which are of practical applications for morphing structures, such as the wings of airplane, especially, but not limited to, unmanned aerial vehicles, energy harvesters, shape-changing mirrors in adaptive optimal systems, valves, etc. The developed bistable or multistable shells offer an approach to hold the deformed configuration via their own mechanical properties. No external supporting component or energy is required, which can largely simplify the structures. Using bistable or multistable shells, the morphing structures can be with better reliabilities due to the simplified structures and the energy for holding the deformed configurations can be saved. The load bearing capacity is high for bistable or multistable shells from this one example embodiment of this invention.

In one example embodiment, a method to construct bistable or multistable shells with designable stable configurations to be used in adaptive structures, such as airplanes, moving cars, trains, etc., to adjust their configurations via a limited energy to realize some functions with aerodynamics, such as changing the flight state, increasing the speed and so on.

Unlike bistable composite shells based on the thermal effect whose stable configurations are usually cylindrical and sensitive to the external temperature and moisture, bistable metallic shells with designable stable configurations are obtainable from one embodiment of the present invention, which are not sensitive to external environment. Also multistable shells holding various configurations can be obtained from the proposed method.

In one bistable example, bistable disks are welcomed for various applications and a convenient method to build them in micro or macro sizes is valuable. Soft materials with large elastic behavior ranges, such as Polydimethylsiloxanen (PDMS), are usually used to develop spherical bistable disks. Without wishing to be bound by materials, an elastic behavior of the materials is assumed for the following theoretical results of the bistable disks produced according to the method in at least one of the example embodiments.

To develop bistable disks without using molds, localized stimulations, which come from physical and/or chemical treatments, including mechanical treatments, laser sintering, temperature, pH, solvent swelling, magnetism, electric current, light, chemical oxidation, and so on, with an equivalent isotropic inelastic strain $\varepsilon_s$ are applied in a local circular region of originally flat disks, as schematically shown in FIG. 9. The stimulations stretch the disk in the local treated region while the untreated region, i.e. region without stimulations, constrains the stretching effect. So internal compressive forces are induced and transversely buckle the flat disks to enable the disks to hold two stable states, when the stimulations are large enough. As the untreated regions are not fixed, the disks deform in these regions too, which make the stable configurations of the disks can be conveniently changed.

Based on an assumption of uniform curvatures for the disks, the deflection at the disk center can be estimated from a simple analytical model developed by inventors according to the equation $$|w| = \sqrt{24 \cdot \varepsilon_s \beta(1-\beta) - 2/(3\alpha^2(1-v)) \cdot R} \quad (1)$$

where $\beta = R_1^2/R^2$ is the ratio of the region with applied stimulations over the whole disk and $\alpha = R/t$ is the flakiness of the disk with thickness t and radius R. v is the Poisson ratio of the material. The maximum value of the point force, which is used to transition the obtained bistable disk applying at the disk center, for the disk to carry before snapping into the other stable state can be estimated as $$|F| = \frac{8\sqrt{2}\,\alpha^2 \cdot \pi E t^3}{12 \cdot R} \cdot \left(\varepsilon_s \beta(1-\beta) - \frac{2}{3\alpha^2(1-v)}\right)^{3/2} \quad (2)$$

which is taken as the snap force or the load bearing capacity of the bistable disk. E is the Young's modulus of the material. Based on the above equations, the deflections and load bearing capacity of the disk increase with $\varepsilon_s$. The disk with a half region applied with in-plane uniform stimulations can have the largest deflections and snap forces.

Figure 10:
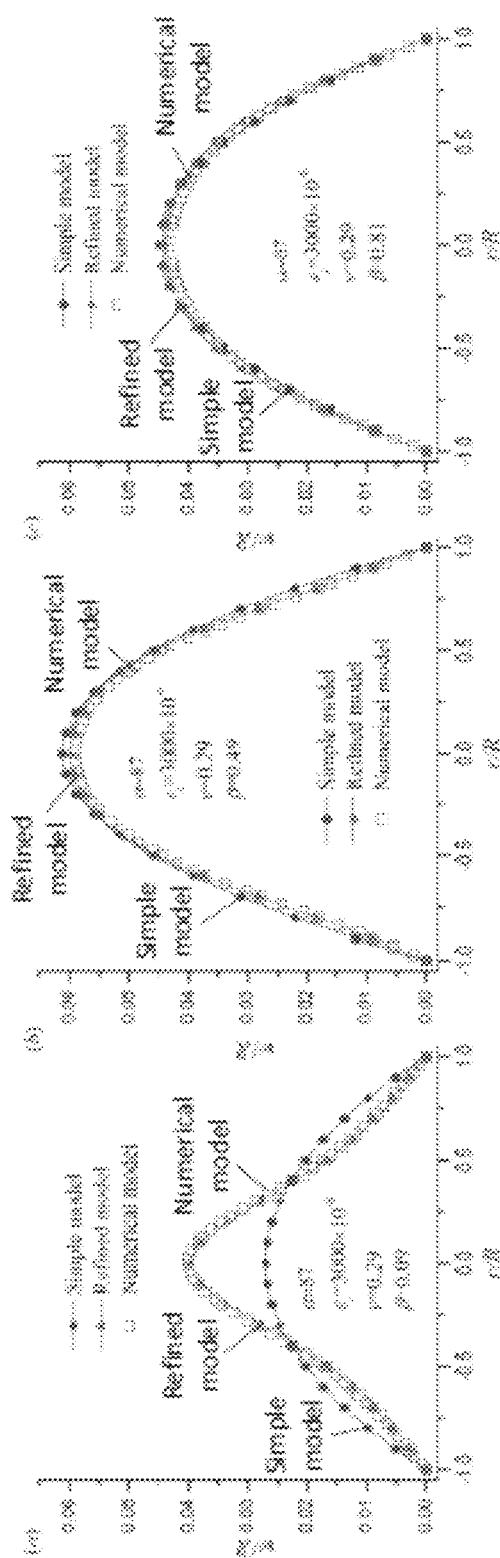
FIG. 10 is an illustration showing the predicted stable configurations of bistable disks of a moderate flakiness with different stimulated regions.
Figure 11:
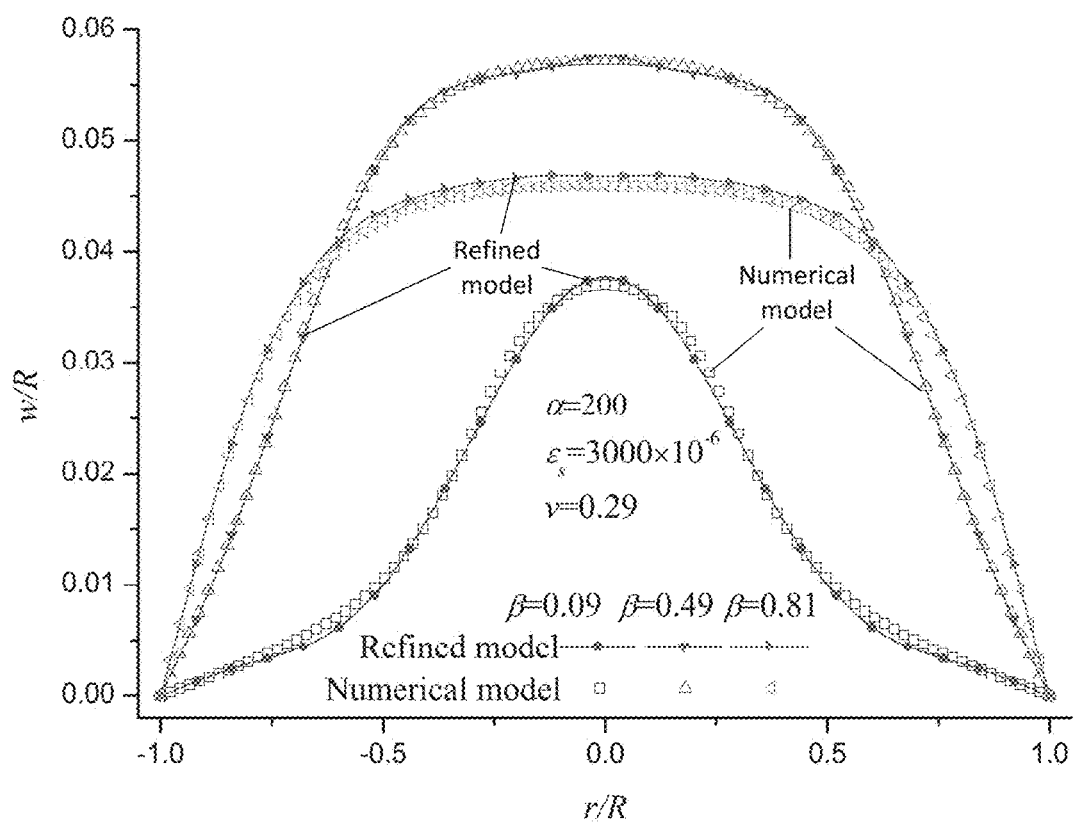
FIG. 11 is an illustration showing the predicted stable configurations of bistable disks of a large flakiness with different stimulated regions.

Through a refined model and numerical simulations, the actual configurations of the disks with different stimulated regions are found by inventors to be different and not uniformly curved, which are determined by $\beta$ and $\alpha$, as shown in FIG. 10. When the flakiness $\alpha$ of the disk is large enough ($\alpha > 180$), the obtained bistable disks may become flat at the disk center, as shown in FIG. 11. The relation of the deflection $|w|$ at the disk center with the ratio $\beta$ slightly deviates with Eq. 1, as shown in FIG. 12. The relation of the snap force $|F|$ to transition the bistable disks with $\beta$ is shown in FIG. 13. The value of $\beta$ to have the bistable disk with the largest deflection and snap force slightly depends on $\alpha$ and $\varepsilon_s$, but always close to 0.5. Disks with $0.53 > \beta > 0.25$ can have comparable large deflections and snap forces.

To embody the invention with real bistable disks, SMAT is used to locally process on two sides of 304 stainless steel disks (R=40 mm, t=0.46 mm) in a local region by turns. The impacts from fast moving balls on the disk surfaces accumulate plastic deformations from two sides little by little during the SMAT processes. The induced plastic deformation is in-plane uniform and transversely symmetrical-gradient as each treating time is short. So only in-plane stimulating forces are induced and no considerable stimulating moment is formed from the accumulated plastic deformation, which can be replaced via an equivalent uniform stimulation.

In embodiments of the bistable disks produced by using SMAT, the surfaces of the untreated regions are covered by adhesive stapes, as shown in FIG. 14. And then the prepared disks are processed with SMAT. The treating time in each turn is 8 seconds. Two stable configurations of one obtained bistable disk are shown in FIG. 15 and the total treating time is 544 seconds. The deflections at the center of disks with different local regions processed are compared with theoretical results with $\varepsilon_s = 3000 \times 10^{-6}$ in FIG. 12, and good agreements are achieved. The transitions of the developed bistable disks are tested by applying a point force at the disk center with a displacement control strategy. Local buckling is observed during the transitions of bistable disks with large stimulated regions ($\beta > 0.25$), which decreases the load bearing capacities of the disks predicted from the theoretical models. The snap forces of disks with different stimulated regions are also shown in FIG. 13. The experimental results showed that the disks with $0.55 > \beta > 0.25$ can have large deflections and snap forces, which agree with the predicted theoretical results. Due to the use of 304 stainless steel with E=192 GPa, the manufactured bistable disks (R=40 mm, t=0.46 mm) can bear external forces of more than one hundred of Newtons before snapping into the other stable state.

It should be pointed out that the elastic deformation ability of the original 304 stainless steel is limited. Owing to the induced nanotwins and meshed grains in nanoscales, the yield strength of the material in the processed region is largely increased and the elastic deformation ability of the manufactured bistable disks is largely enhanced. So no plastic deformation is involved during the transitions of the developed bistable disks or shells.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A multistable structure comprising:
   local portions arranged to undergo processing by at least one of a physical treatment and chemical treatment so as to form localized stimulation of the treated portions;
   wherein the treated portions are arranged to interact with the untreated portion of the structure to form a prescribed residual stress distribution associated with the treated portions and the untreated portion of the structure, the prescribed residual stress distribution being arranged to provide at least one alternative stable configuration to the structure; and wherein the treated portion becomes a nanostructured portion.

2. A multistable structure comprising:

local portions arranged to undergo processing by at least one of a physical treatment and chemical treatment so as to form localized stimulation of the treated portions;

wherein the treated portions are arranged to interact with the untreated portion of the structure to form a prescribed residual stress distribution associated with the treated portions and the untreated portion of the structure, the prescribed residual stress distribution being arranged to provide at least one alternative stable configuration to the structure; and wherein the stimulation is an accumulation of in-plane uniform and transversely gradient plastic deformation in the treated portion.

3. A multistable structure comprising:

local portions arranged to undergo processing by at least one of a physical treatment and chemical treatment so as to form localized stimulation of the treated portions;

wherein the treated portions are arranged to interact with the untreated portion of the structure to form a prescribed residual stress distribution associated with the treated portions and the untreated portion of the structure, the prescribed residual stress distribution being arranged to provide at least one alternative stable configuration to the structure; and wherein the optimal stability of the structure has a treated portion to structure ratio of 25%-53%.

4. The multistable structure according to claim 1, 2, or 3, wherein more than one stable configuration can be held without consuming external energies or requiring supports for the processed structure, depending on the number of the treated portions.

5. The multistable structure according to claim 1, 2, or 3, wherein the localized stimulation is obtained from mechanical treatments, laser sintering, temperature, pH, solvent swelling, magnetism, electric current, light and/or chemical oxidation.

6. The multistable structure according to claim 1, 2, or 3, wherein the physical treatment includes surface manipulating technique.

7. The multistable structure according to claim 1, 2, or 3, wherein the physical treatment includes surface mechanical attrition treatment (SMAT).

8. The multistable structure according to claim 1, 2, or 3, wherein the treated portions are stretched with the induced stimulations from the physical treatment and/or chemical treatment, and constrained by the untreated portion.

9. The multistable structure according to claim 1, 2, or 3, wherein a multistable behavior of the multistable structure is associated with the interaction between the treated portion and the untreated portion such that the structure deforms into stable configurations by induced internal forces to relief compressive stresses through the coupling effect of stretching and bending deformations.

10. The multistable structure according to claim 1, 2, or 3, wherein the configuration is manipulated by the combinations of a plurality of treated portions capping up or down.

11. The multistable structure according to claim 1, 2, or 3, wherein the treated portion can have various shapes, such as circular, elliptic, rectangular, triangular, or irregular shapes, and be distributed in row, matrix, or irregular forms.

12. The multistable structure according to claim 1, 2, or 3, wherein the transitions among multiple stable configurations do not involve any plastic deformations but stay within the elastic regime of the structure.

13. The multistable structure according to claim 1, 2, or 3, wherein the local portion has predetermined zones to be treated with physical treatment forming at least part of the multistable structure.

14. The multistable structure according to claim 1, 2, or 3, wherein the treated portions act as switchers to manipulate the configurations.

15. The multistable structure according to claim 1, 2, or 3, wherein the physical treatment is a surface manipulating technique and wherein a nanocrystalline surface layer, refine grains in nanoscales and nontwins are induced in the treated portion by the surface manipulating technique.

16. The multistable structure according to claim 1, 2, or 3, wherein the physical treatment is a surface manipulating technique and wherein a yield strength and elastic behavior regime of the structure are enhanced by the surface manipulating technique.

17. The multistable structure according to claim 1, 2, or 3, wherein a shape of original structure and the treated portion are circular and the processed structure forms a bistable disk.

18. The multistable structure according to claim 1, 2, or 3, wherein the multi-stable configurations of the structure are determined by the applied physical or/and chemical treatment, geometries of the treated portions and the structure.

19. The multistable structure according to claim 1, 2, or 3, wherein the treated portion to structure ratio of about 50% gives maximum deflections in stable configurations and load bearing capacities for the processed structure.

20. The multistable structure according to claim 1, 2, or 3, wherein further mechanical manipulations including plastically bending or folding could be applied to modify the configurations of the processed structure with local stimulations.

21. The multistable structure according to claim 1, 2, or 3, wherein the structure is made of hard materials such as metals.

22. The multistable structure according to claim 1, 2, or 3, wherein the structure is made of soft materials such as Polydimethylsiloxane (PDMS).

* * * * *